United States Patent

Matsuura et al.

[11] Patent Number: 5,702,144
[45] Date of Patent: Dec. 30, 1997

[54] ARTICLE STORAGE STRUCTURE FOR MOTOR VEHICLE

[75] Inventors: Tatsuo Matsuura; Atsushi Inoue, both of Wako, Japan

[73] Assignee: Honda Giken Kogyo Kabushiki Kaisha, Tokyo, Japan

[21] Appl. No.: 722,929

[22] Filed: Sep. 30, 1996

[30] Foreign Application Priority Data

Oct. 6, 1995 [JP] Japan .................................. 7-259945

[51] Int. Cl.$^6$ .................................................. B60R 7/00
[52] U.S. Cl. .................................. 296/37.13; 296/37.16; 296/50; 410/109; 410/112; 224/311; 224/568
[58] Field of Search ................. 296/37.13, 37.16, 296/37.8, 50; 410/112, 109; 224/311, 568

[56] References Cited

U.S. PATENT DOCUMENTS

| | | | |
|---|---|---|---|
| 2,019,674 | 11/1935 | Graebner | 296/37.13 |
| 4,283,083 | 8/1981 | Johnson | 296/50 |
| 4,750,774 | 6/1988 | Pickering | 296/37.13 |
| 5,072,983 | 12/1991 | Muroi et al. | 296/37.13 |

*Primary Examiner*—Gary C. Hoge
*Attorney, Agent, or Firm*—Armstrong, Westerman Hattori, McLeland & Naughton

[57] ABSTRACT

An article storage structure has a wall defining a cavity in an inner lining of a motor vehicle tailgate, and a belt for fastening an article stored in the cavity. The belt extends along an inner surface of the wall and has opposite ends exposed in the cavity. A fastening device is connected to the opposite ends of the belt, for tightening the belt. The article storage structure effectively utilizes the space in the tailgate, and firmly and reliably holds the article in position in the cavity.

5 Claims, 3 Drawing Sheets

ARTICLE STORAGE STRUCTURE FOR MOTOR VEHICLE

BACKGROUND OF THE INVENTION

1. Field of the Invention

The present invention relates to an article storage structure for storing and holding in position an article or articles in a rear door of a motor vehicle.

2. Description of the Related Art

Recreational vehicles (RVs) dedicated for enjoying leisure activities are finding widespread use among people whose life-styles are changing in recent years. Such recreational vehicles employ a tailgate which is hinged to be opened and closed vertically or horizontally.

The tailgate has a relatively large space defined therein. Such a relatively large space may be used to store an article or articles such as a triangular sign plate.

However, if an article or articles are simply placed in the space in the tailgate, then when the recreational vehicle runs, the article or articles tend to collide with a wall in the tailgate, making noise. One solution is to fasten the article or articles with two belts having ends secured to the wall at upper and lower positions and opposite ends tightened together. The belts, however, are unable to fasten the article or articles with sufficiently strong forces and hence to hold the article or articles reliably against movement in the space in the tailgate.

SUMMARY OF THE INVENTION

It is a main object of the present invention to provide an article storage structure which effectively utilizes a space in a tailgate and is capable of holding an article or articles securely and reliably in the space in the tailgate.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
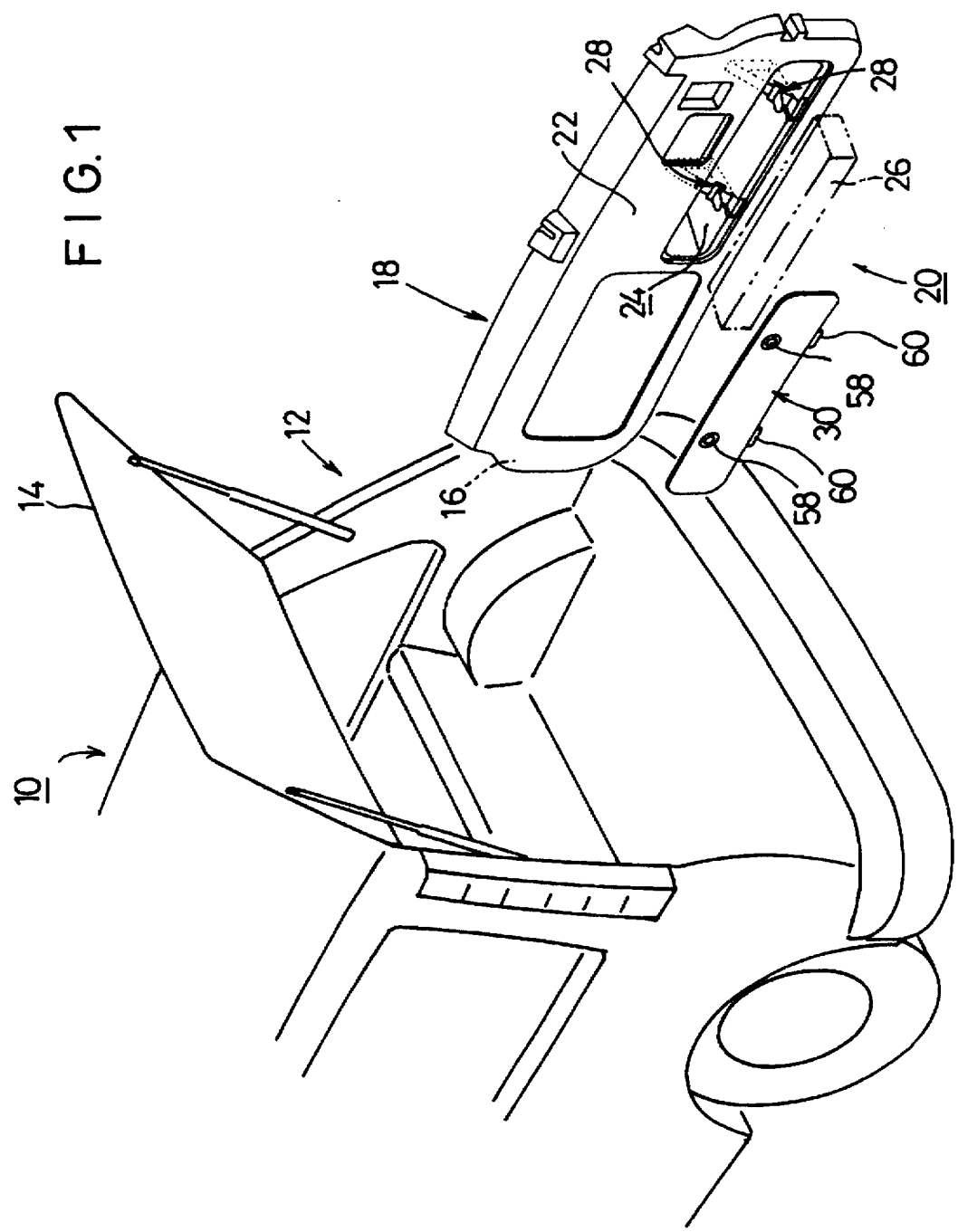
FIG. 1 is a perspective view of a rear portion of a motor vehicle body which incorporates an article storage structure according to an embodiment of the present invention.

FIG. 1 shows a rear portion 12 of a motor vehicle body 10 which incorporates an article storage structure according to an embodiment of the present invention. The rear portion 12 has a rear window panel 14 which is hinged to be opened and closed vertically, and a tailgate 18 which horizontally openable about a vertical pivot 16 on one side of a rear opening of the rear portion 12. The tailgate 18 incorporates an article storage structure 20 according to the present invention.

Figure 2:
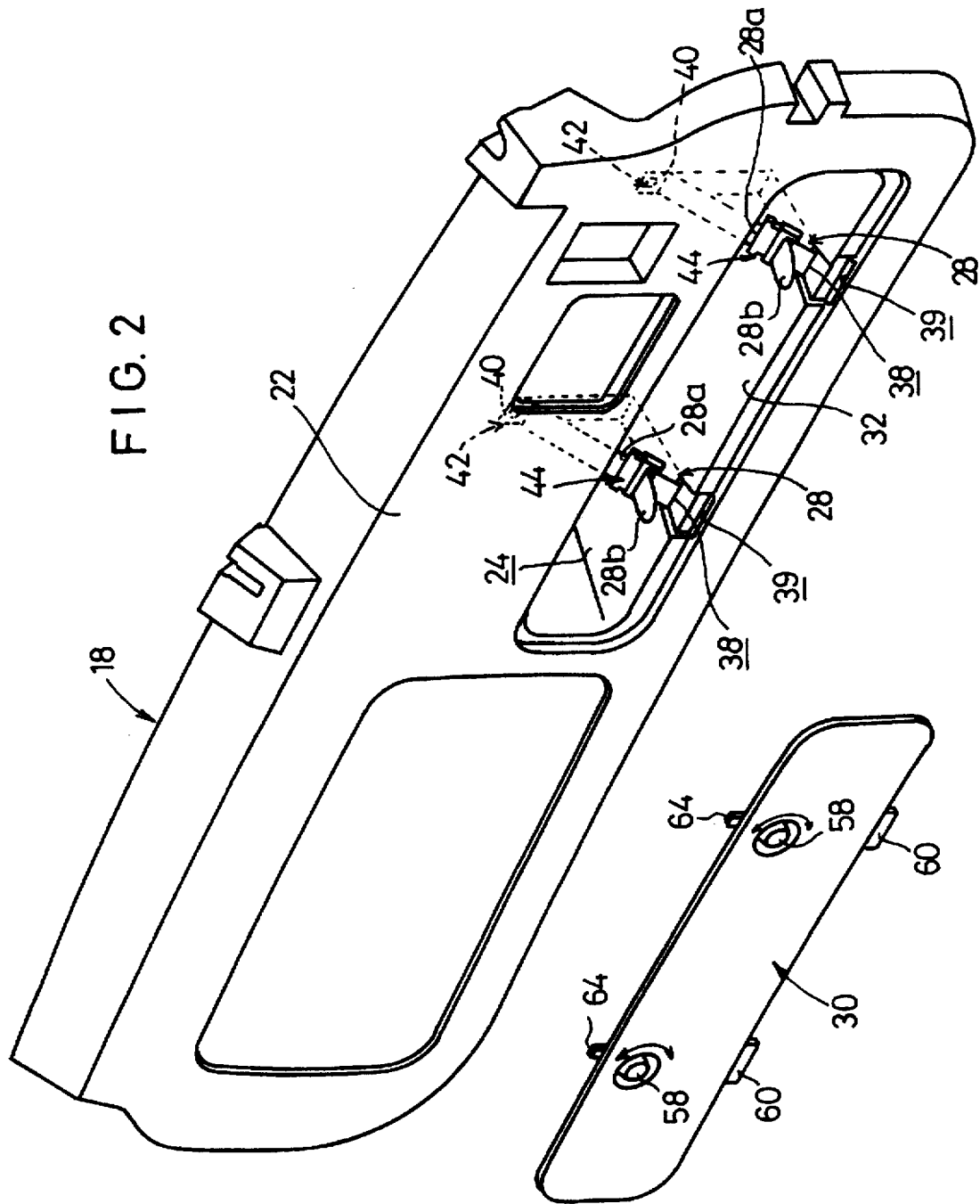
FIG. 2 is an enlarged perspective view of the article storage structure.
Figure 3:
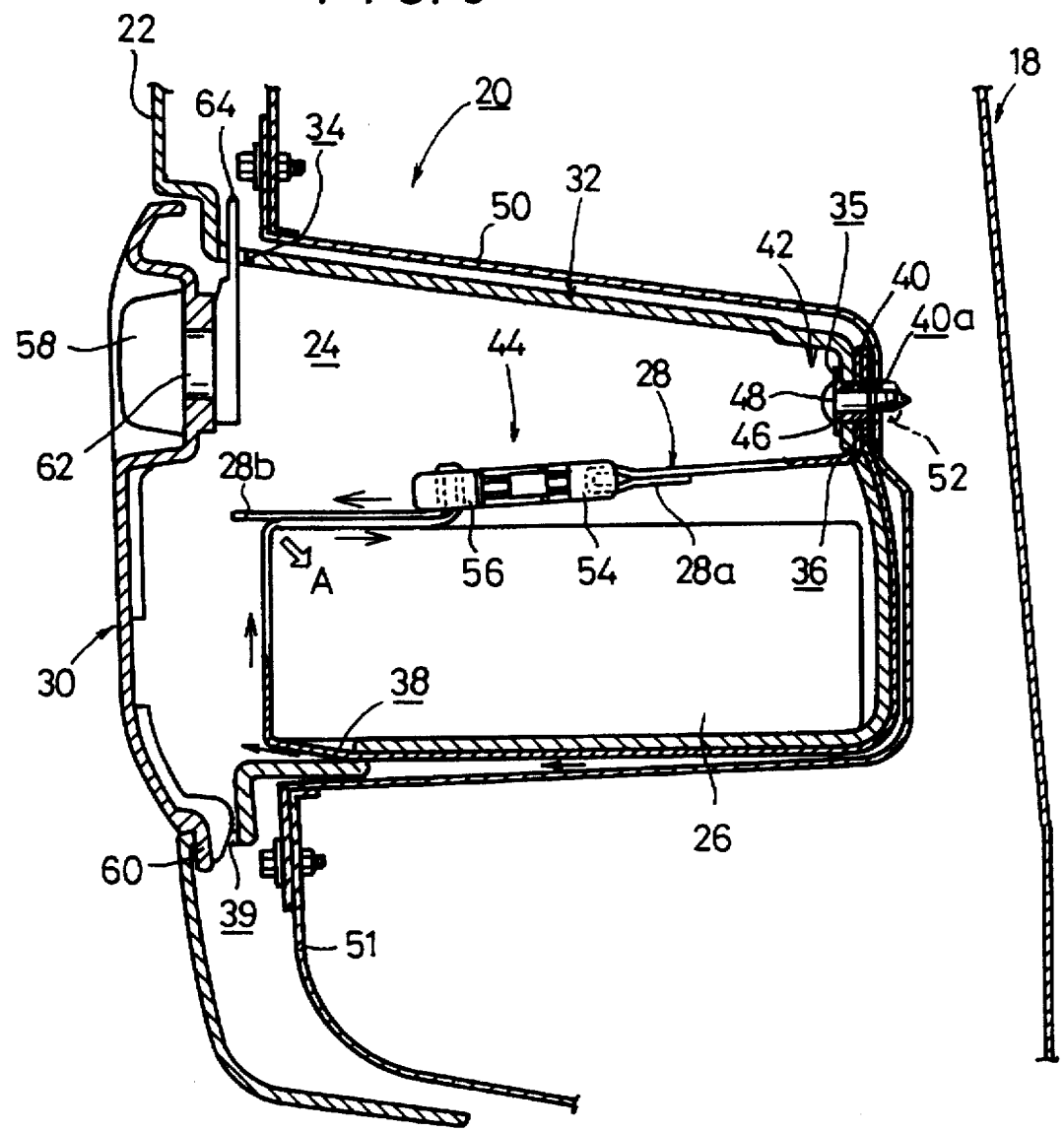
FIG. 3 is a vertical cross-sectional view of the article storage structure.

As shown in FIGS. 1 through 3, the article storage structure 20 has a cavity 24 defined in an inner lining 22 of the tailgate 18, a pair of horizontally spaced vertical belts 28 disposed in the cavity 24 for fastening an article 26 accommodated in the cavity 24, and a lid 30 for closing the cavity 24.

As shown in FIG. 3, the cavity 24 is defined by a forwardly open box-shaped wall 32. The wall 32 has a pair of holes 34 defined in a front upper edge thereof above the open front end of the wall 32 and a pair of holes 35 and a pair of first apertures 36 which are defined in an upper portion of a rear panel of the wall 32 which is remote from the open front end of the wall 32. The wall 32 also has a pair of second apertures 38 and a pair of openings 39 which are defined in a front portion of a lower panel of the wall 32.

The belts 28 are introduced through the first apertures 36 into the wall 32, and have folded portions 40 secured to an inner surface of the wall 32 by fasteners 42. The belts 28 then extend along the inner surface of the wall 32, and are drawn out of the wall 32 through the second apertures 38 into the cavity 24. Opposite ends 28a, 28b of the belts 28 which are exposed in the cavity 24 are separably fastened to each other by fastening devices 44 attached to the opposite ends 28a, 28b.

Each of the fasteners 42 comprises an eyelet 46 inserted in the hole 35 and a hole 40a defined in the folded portion 40 of the belt 28, and a self-tapping screw (fastening element) 48 inserted in the eyelet 46 to fasten the belt 28 to the inner surface of the wall 32. A pair of brackets 50 is disposed in the wall 32 in association with the respective fasteners 42. Each of the brackets 50 has upper and lower ends secured to a panel 51 of the tailgate 18 by respective bolts, and also has a grommet 52 in which the self-tapping screw 48 is threaded to connect the folded portion 40 to the inner surface of the wall 32.

Each of the fastening devices 44 comprises a first fastening member 54 affixed to the end 28a of one of the belts 28 and a second fastening member 56 to which the other end 28a of the belt 28 is adjustably and removably connected. Each of the fastening devices 44 of the quick-connect-and-disconnect type such that the first and second fastening members 54, 56 can quickly be connected to and disconnected from each other. Since the structure of the fastening devices 44 of the quick-connect-and-disconnect type is well known in the art, it will not be described in detail below.

The first and second fastening members 54, 56 may be replaced with a single fastening member, and the end 28a of the belt 28 may be affixed to the single fastening member and the other end 28b thereof may be adjustably and removably connected to the single fastening member.

The lid 30 has a pair of horizontally spaced knobs 58 and a pair of horizontally spaced teeth 60 for engaging in the respective openings 39 in the wall 32. The knobs 58 are fixedly mounted on respective ends of angularly movable shafts 62 mounted on the lid 30. Fingers 64 which can be inserted respectively into the holes 34 in the wall 32 are fixedly mounted on the respective other ends of the angularly movable shafts 62.

Operation of the article storage structure 20 will be described below.

For storing an article 26 such as a triangular sign plate, for example, into the cavity 24 in the tailgate 18, the user grips and turns the knobs 58 on the lid 30 through about 90° until the fingers 64 are displaced out of the holes 34. Then, the user pulls the lid 30 upwardly to remove the teeth 60 out of the openings 39. The lid 30 is now detached from the inner lining 22 of the tailgate 18.

Thereafter, with the first and second fastening members 54, 56 released from each other, the user places the article 26 into the cavity 24. The user then places the ends 28a of the belts 28 on the article 26, and pulls the other ends 28b upwardly and places them on the article 26. The user couples the first and second fastening members 54, 56 to each other, and pulls the ends 28a in the directions indicated by the arrows, thereby tightening the article 26 with the belts 28.

After the article 26 is stored and securely held in place in the cavity 24 by the belts 28, the user positions the lid 30 in front of the cavity 24. The user then inserts the teeth 60 into the respective openings 39 and turns the knobs 58 through about 90° until the fingers 64 are inserted into the respective holes 34. The lid 30 is now securely attached to the inner lining 22 of the tailgate 18.

As shown in FIG. 3, the belts 28 extend along the inner surface of the wall 32 and their opposite ends 28a, 28b are exposed in the cavity 24. Therefore, when the ends 28b of the belts 28 are pulled in the directions indicated by the arrows with the fastening devices 44 coupled, the belts 28 exert sufficient tightening forces to the article 26 in the cavity 24. Accordingly, the article 26 in the cavity 24 is securely and reliably held in place in the cavity 24 against unwanted movement and hence does not make noise.

Furthermore, the folded portions 40 of the belts 28 are disposed on the inner surface of the wall 32, and the self-tapping screws 48 are inserted through the respective eyelets 46 in the holes 40a in the folded portions 40 and threaded into the respective grommets 52. Therefore, the self-tapping screws 48 are prevented from direct contact with the belts 28 and hence from damaging the belts 28. The belts 28 can also be fixed to the inner lining 22 by the eyelets 46. The self-tapping screws 48 can be tightened with ease.

With the article storage structure according to the present invention, as described above, the belts are used to tighten the article placed in the cavity in the tailgate, and the belts extend along the inner surface of the wall which defines the cavity and have opposite ends exposed in the cavity. Consequently, when the article in the cavity is tightened by the belts, the belts apply sufficient tightening forces to the article, thereby firmly securing the article in place in the cavity. The article thus held in position in the cavity is securely and reliably stored in the cavity against unwanted movement and hence does not make noise.

Although a certain preferred embodiment of the present invention has been shown and described in detail, it should be understood that various changes and modifications may be made therein without departing from the scope of the appended claims.

What is claimed is:

1. An article storage structure comprising:
   a wall defining a cavity in an inner lining of a motor vehicle tailgate;
   a belt for fastening an article stored in said cavity;
   fastening means, connected to said opposite ends of said belt, for tightening said belt; and
   fastener means for fastening a folded portion of said belt to an inner surface of said wall, said fastener means comprising:
   an eyelet inserted in a hole defined in said folded portion of said belt; and
   a fastening element inserted through said eyelet to connect said belt to said inner surface of said wall.

2. The article storage structure according to claim 1, wherein said fastening element comprises a self-tapping screw inserted through said eyelet, further comprising a grommet disposed inwardly of said inner surface of said wall, said self-tapping screw being threaded into said grommet.

3. The article storage structure according to claim 1, wherein said fastening means comprises:
   a first fastening member affixed to one of said opposite ends of said belt; and
   a second fastening member to which an end of said opposite ends of said belt which is not affixed to said first fastening member is adjustably and removably connected, said first fastening member and said second fastening member being detachably connected to each other in a quick-connect-and-disconnect manner.

4. The article storage structure according to claim 1, comprising a pair of belts for fastening said article at two locations in said cavity.

5. The article storage structure according to claim 1, further comprising a lid detachably mounted on said inner lining for closing said cavity.

* * * * *